(12) United States Patent
Nussbaum et al.

(10) Patent No.: US 10,065,666 B2
(45) Date of Patent: Sep. 4, 2018

(54) CART AND DOLLY HANDLE WITH STACKING POSITION

(71) Applicant: ORBIS Corporation, Oconomowoc, WI (US)

(72) Inventors: Robert Guy Nussbaum, Oconomowoc, WI (US); Benjamin Joel Thompson, Johnson Creek, WI (US); Stephen Roland Howe, Cottage Grove, WI (US)

(73) Assignee: ORBIS Corporation, Oconomowoc, WI (US)

( * ) Notice: Subject to any disclaimer, the term of this patent is extended or adjusted under 35 U.S.C. 154(b) by 0 days.

(21) Appl. No.: 15/375,815

(22) Filed: Dec. 12, 2016

(65) Prior Publication Data

US 2017/0190342 A1  Jul. 6, 2017

Related U.S. Application Data

(60) Provisional application No. 62/273,829, filed on Dec. 31, 2015, provisional application No. 62/273,061, filed on Dec. 30, 2015.

(51) Int. Cl.
*B62B 3/00* (2006.01)
*B62B 3/02* (2006.01)
*B62B 3/16* (2006.01)

(52) U.S. Cl.
CPC . *B62B 3/02* (2013.01); *B62B 3/16* (2013.01)

(58) Field of Classification Search
CPC ................................ B62B 3/16; B62B 3/1476
USPC ................................ 280/79.11, 655.1, 33.998
See application file for complete search history.

(56) References Cited

U.S. PATENT DOCUMENTS

| 2,706,643 A |   | 4/1955 | Babcock |
|---|---|---|---|
| 4,203,609 A | * | 5/1980 | Mitchell ............... B62D 13/04 108/55.3 |
| 4,272,100 A |   | 6/1981 | Kassai |
| 4,274,644 A | * | 6/1981 | Taylor ...................... B62B 3/02 280/39 |
| 5,299,816 A | * | 4/1994 | Vom Braucke ....... B62B 3/1476 280/33.998 |

(Continued)

FOREIGN PATENT DOCUMENTS

| CN | 2246607 Y | 2/1997 |
|---|---|---|
| DE | 3917279 A1 | 11/1990 |

(Continued)

OTHER PUBLICATIONS

Russian Federal Institute of Industrial Property, International Search Report and Written Opinion of International Searching Authority for International Application No. PCT/US2016/066297, dated Mar. 16, 2017 (7 pages).

(Continued)

*Primary Examiner* — Jeffrey J Restifo
(74) *Attorney, Agent, or Firm* — Greensfelder, Hemker & Gale, P.C.

(57) ABSTRACT

A transport structure, such as a cart or dolly having a handle moveable from a first position to a second position is disclosed. In the first position, the handle extends outward from an edge of the cart or dolly and can be used for pushing or pulling the cart or dolly. In the second position, the handle is moved to extend generally parallel to an upper surface of the cart or dolly so that it can be stored or transported with the cart or dolly.

20 Claims, 7 Drawing Sheets

(56) References Cited

U.S. PATENT DOCUMENTS

| | | | |
|---|---|---|---|
| 5,538,267 A | 7/1996 | Pasin et al. | |
| 5,711,540 A * | 1/1998 | Nesting | B62B 3/16 280/33.998 |
| 5,876,049 A * | 3/1999 | Spear | B62B 3/02 280/33.998 |
| 6,024,376 A * | 2/2000 | Golichowski | B62B 3/022 16/35 R |
| 6,224,072 B1 | 5/2001 | Weck et al. | |
| 6,257,152 B1 * | 7/2001 | Liu | B62B 5/0083 108/53.3 |
| 6,349,951 B1 * | 2/2002 | Mogensen | B60B 30/10 280/33.998 |
| 6,499,750 B1 | 12/2002 | Michelau | |
| 6,877,764 B2 * | 4/2005 | Sagol | B62B 5/06 280/47.371 |
| 6,979,005 B1 * | 12/2005 | McLerran | B62B 3/00 108/53.1 |
| 7,201,385 B2 * | 4/2007 | Renz | B62B 3/02 280/47.34 |
| D570,068 S * | 5/2008 | Dukes | B62B 3/10 D34/17 |
| 7,458,589 B2 * | 12/2008 | Vanderberg | A45C 7/004 280/33.998 |
| 7,462,009 B2 * | 12/2008 | Hartmann | B62B 5/049 280/47.371 |
| 8,424,901 B2 * | 4/2013 | Vanderberg | B62B 3/10 280/47.18 |
| 8,827,305 B2 * | 9/2014 | Saito | B62B 5/067 280/655.1 |
| 8,979,098 B2 * | 3/2015 | Wang | B62B 3/022 280/39 |
| 9,067,614 B2 * | 6/2015 | Vanderberg | B62B 3/16 |
| 9,440,594 B1 * | 9/2016 | Clamont Bello | B60R 5/04 |
| 9,561,815 B2 * | 2/2017 | Choi | B62B 5/06 |
| 9,573,421 B2 * | 2/2017 | Tiilikainen | B62B 5/06 |
| 2003/0234517 A1 * | 12/2003 | Sagol | B62B 5/06 280/655.1 |
| 2004/0232660 A1 * | 11/2004 | Chen | B62B 3/02 280/651 |
| 2008/0197592 A1 * | 8/2008 | Dukes | B62B 3/1476 280/47.34 |
| 2012/0049472 A1 * | 3/2012 | Patterson | B62B 3/16 280/33.998 |
| 2013/0193673 A1 * | 8/2013 | Vanderberg | B62B 3/16 280/655 |
| 2014/0175765 A1 * | 6/2014 | Tiilikainen | B60B 33/0005 280/79.11 |
| 2016/0137215 A1 * | 5/2016 | Ondrasik | B62B 3/16 280/33.992 |

FOREIGN PATENT DOCUMENTS

| | | |
|---|---|---|
| GB | 2334007 A | 8/1999 |
| SU | 1588619 A1 | 8/1990 |
| WO | 2014120022 A1 | 8/2014 |

OTHER PUBLICATIONS

Russian Federal Institute of Industrial Property, International Search Report and Written Opinion of International Searching Authority for International Application No. PCT/US2016/066312, dated Apr. 20, 2017 (6 pages).

* cited by examiner

CART AND DOLLY HANDLE WITH STACKING POSITION

CROSS-REFERENCE TO RELATED APPLICATIONS

The present invention claims the benefit of U.S. Provisional Patent Application No. 62/273,061 filed Dec. 30, 2015, and U.S. Provisional Patent Application No. 62/273,829 filed Dec. 31, 2015, the contents of which are incorporated herein by reference.

FEDERALLY SPONSORED RESEARCH OR DEVELOPMENT

N/A

FIELD OF THE INVENTION

The present invention generally relates to a cart or dolly having a handle that is moveable from a first position to a second position.

BACKGROUND OF THE INVENTION

Carts, dollies and other similar structures are used for transporting goods or other articles, typically held in containers. Typically, a detachable handle is used to move the cart or dolly. The handles tend to be rigid structures with no moving parts, and have a range of movement that allows for two working positions—pushing and pulling—and a resting position (which is usually the same as the pulling position). The handles are removed during storage or transport of the cart or dolly in a truck or other similar transport vehicle or container. The handles are typically shipped separately.
The present invention provides an improved cart or dolly with a handle that is moveable from a first position for pushing and pulling of the cart or dolly to a second position for storage.

SUMMARY OF THE INVENTION

The present invention provides a dolly or cart having two operable positions. The handle can be moved to a first position extending upward and outward from the dolly for normal use of pulling or pushing the dolly. The handle can be also be moved (e.g., rotated, slid) to a second position so that the handle is sitting on the top or bottom of the deck portion of the dolly (or possibly in a well or recess so that it is flush with the top/bottom surface of the dolly). In this second position the handle is out of the way, but still positively engaged with the dolly. In this second position, the dollies can be stacked (when empty) in a normal manner and the handles can stay with the dollies during storage and/or transport.

In accordance with one aspect of the invention, the handle is configured so that it rotates downward and/or slides underneath the dolly when not in use. In this embodiment, the handle does not have to be removed if a load stays on the dolly.

The handle can also be detachably connected to the dolly. In this instance, the handle can be removed if a load on the dolly is not removed after the dolly has been pushed or pulled to another location (e.g., a truck).

In accordance with another aspect of the invention, a transport structure with a handle moveable from a first position to a second position is provided. The transport structure, such as a cart or dolly, comprises a platform having a generally planar upper surface for supporting loads and a plurality of wheels connected to a lower surface or portion. The structure also includes a handle having a first end and a second end. The handle is connected to the platform at the first end and is moveable from a first position extending upwardly and outwardly from the platform to a second collapsed position extending generally parallel to the upper surface of the platform.

The handle can be rotatably connected to the platform. This enables the handle to rotate from the first position to the second position, and back again to the first position. The handle can be connected proximate a first edge of the platform, such as an end or side of the platform. Moreover, the handle can be detachably connected to the platform. The handle can also be extendable (i.e., have multiple lengths).

The platform can be a molded plastic or other suitable material. The handle can be metal or plastic, or some other suitable material.

The platform can include a recess or well in the upper surface to accommodate the handle when the handle is in the second position. The platform can include one or more openings, such as a central opening.

In accordance with another aspect of the invention, a dolly with a handle is provided. The dolly comprises a generally rectangular platform having an upper support surface. The platform has a first side, a second side opposing the first side, a first end and a second end opposing the first end, and a plurality of wheels connected to a lower portion of the platform. A handle structure is connected to the platform. The handle structure can be in a first extended position for enabling one of pushing and pulling the dolly using the handle, or a second collapsed position.

The handle can include a first end connected to the platform and a second end having a hand clasp portion. The handle can be connected proximate the first end of the platform or the first side of the platform.

The handle can be rotatably connected to the platform.

The dolly can also include a recess in the upper surface of the platform for receiving the handle when the handle is in the second position.

The handle can include a telescoping structure and be extendable from a first length to a second length greater than the first length.

Further aspects of the invention are disclosed in the Figures, and are described herein.

BRIEF DESCRIPTION OF THE DRAWINGS

To understand the present invention, it will now be described by way of example, with reference to the accompanying drawings in which.

DETAILED DESCRIPTION

Figure 1:
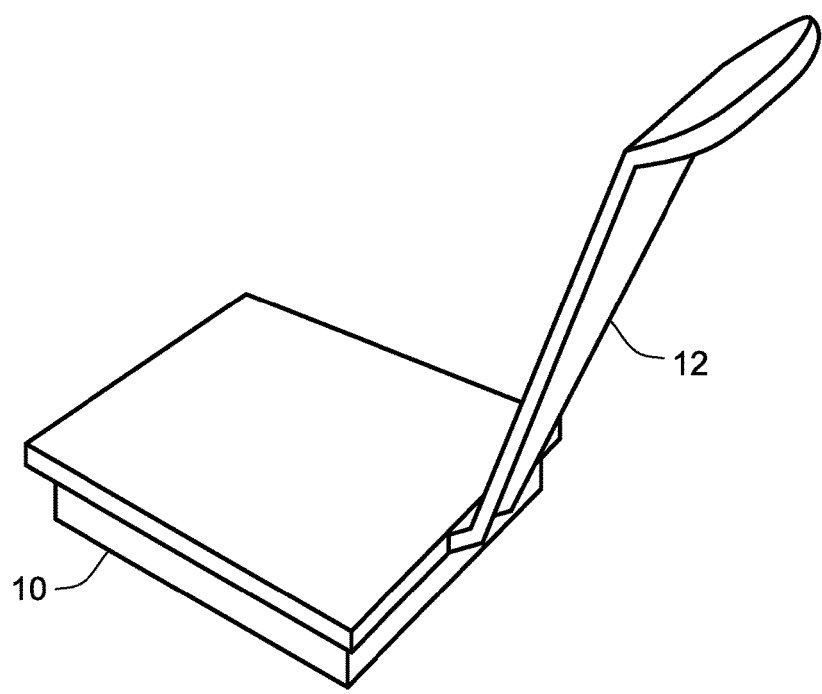
FIG. 1 is a perspective view of one known dolly and handle with the handle inserted in the dolly for use.

While this invention is susceptible of embodiments in many different forms, there is shown in the drawings, and will herein be described in detail preferred embodiments of the invention with the understanding that the present disclosure is to be considered as an exemplification of the principles of the invention and is not intended to limit the broad aspect of the invention to the embodiments illustrated.

The present invention is directed to transport structures, such as carts or dollies and other similar structures, and to handles for pushing or pulling the transport structures. The carts or dollies, and the handles, are typically formed from a molded plastic or other suitable material.

Prior to the present invention, handles for moving a cart or dolly were only able to engage the cart or dolly in a single position (i.e., extending upward and outward from an edge of the cart or dolly). After pushing or pulling the cart or dolly to the desired location, the handle was then removed from the cart or dolly. The handles had to be separately stored or transported for later use with the cart or dolly.

Figure 2:
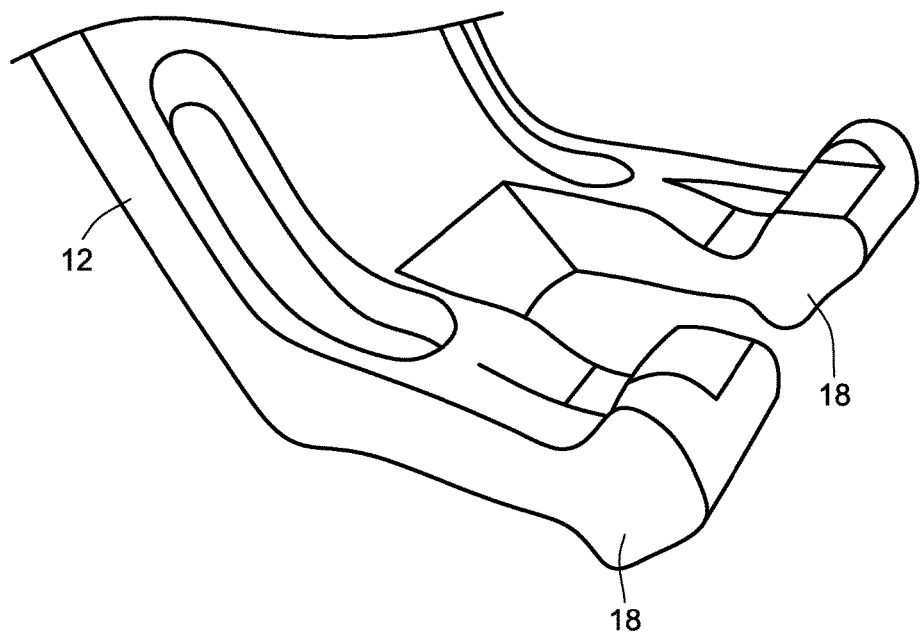
FIG. 2 is a perspective view of a lower portion of the handle of FIG. 1 removed from the dolly.
Figure 3:
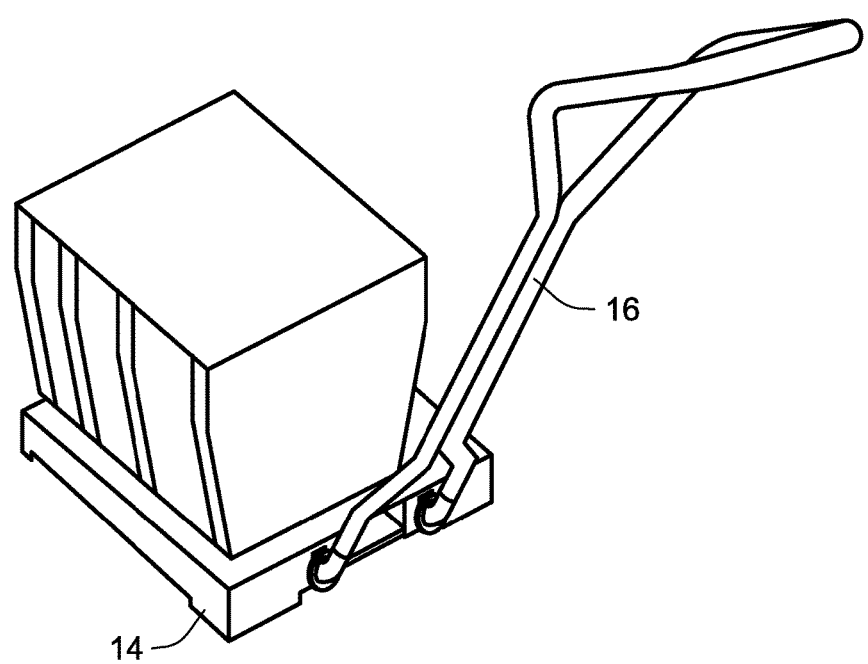
FIG. 3 is a perspective view of another known dolly and handle with the handle inserted into the dolly for use.
Figure 4:
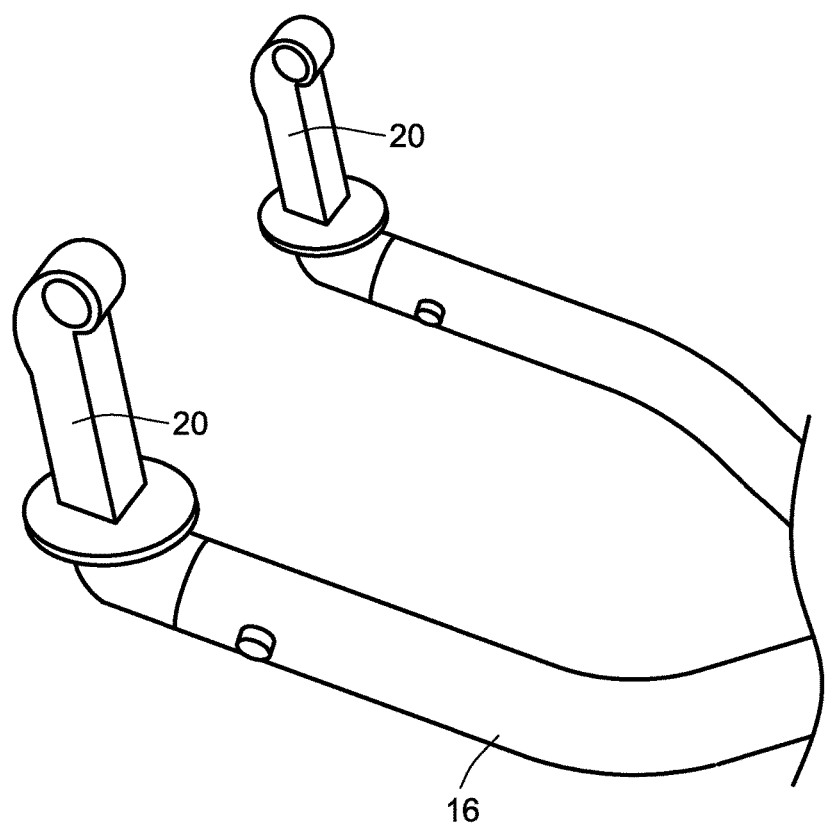
FIG. 4 is a perspective view of a lower portion of the handle of FIG. 3 removed from the dolly.

FIGS. 1 and 2 disclose a first known dolly 10 and handle 12 system. FIGS. 3 and 4 disclose a second similar known dolly 14 and handle 16 system.

As shown in FIG. 2, the bottom end of the handle 12 included hook-like features 18. These hook-like features 18 were inserted into corresponding structure in the dolly to enable pushing or pulling of the dolly by the handle 12. The handle 16 of the second known system has similar hook-like features 20.

The present invention does not require separately storing or transporting handles for pushing or pulling carts or dollies. Instead, the handle of the present invention can be used in two different positions with respect to the cart or dolly. In a first position, the handle extends outward from the cart or dolly and can be used in a typical manner to push or pull the cart or dolly and any load thereon. In a second position, the handle is positioned against the dolly and can be stored or transported with the cart or dolly.

Figure 5:
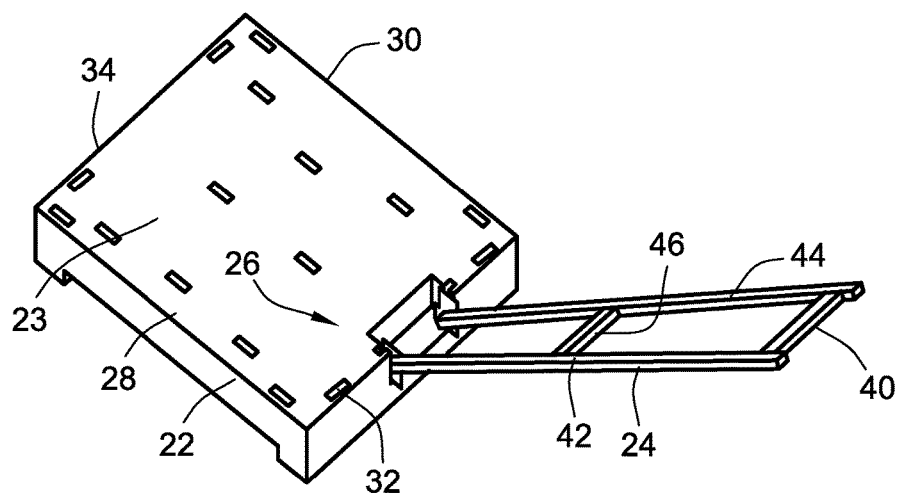
FIG. 5 is a perspective view of a dolly and handle in accordance with the present invention with the handle in a usable position.
Figure 7:
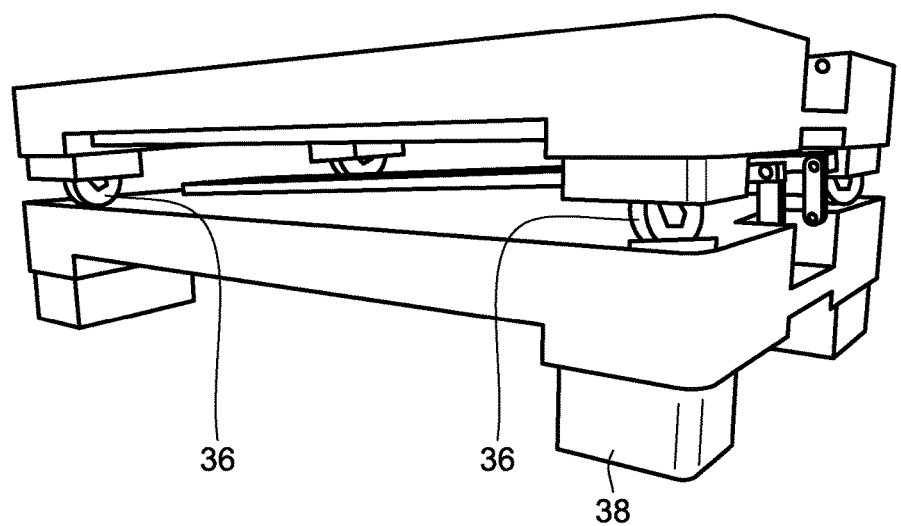

FIG. 5 shows a dolly 22 in accordance with the present invention having a handle 24 connected to the dolly 22 at one end of the handle 24. The dolly 22 includes a generally rectangular platform 23 having an upper support surface 26. The platform 23 extends from a first side 28 to a second side 30, and from a first end 32 to a second end 34. As shown in FIG. 7, a plurality of wheels 36 are connected to the lower portion of the platform (typically, in the corner regions). Wheel guards 38 can be used to protect the wheels 36.

In FIG. 5, the handle 24 is shown extending upward and outward in the first position for use in pushing or pulling the dolly 22. As shown, the handle 24 is connected at a lower end proximate the first end 32 of the platform 23. The handle 24 can similarly be connected to a side of the platform 23. The handle 24 extends upward to a hand grasping portion 40.

Figure 6:
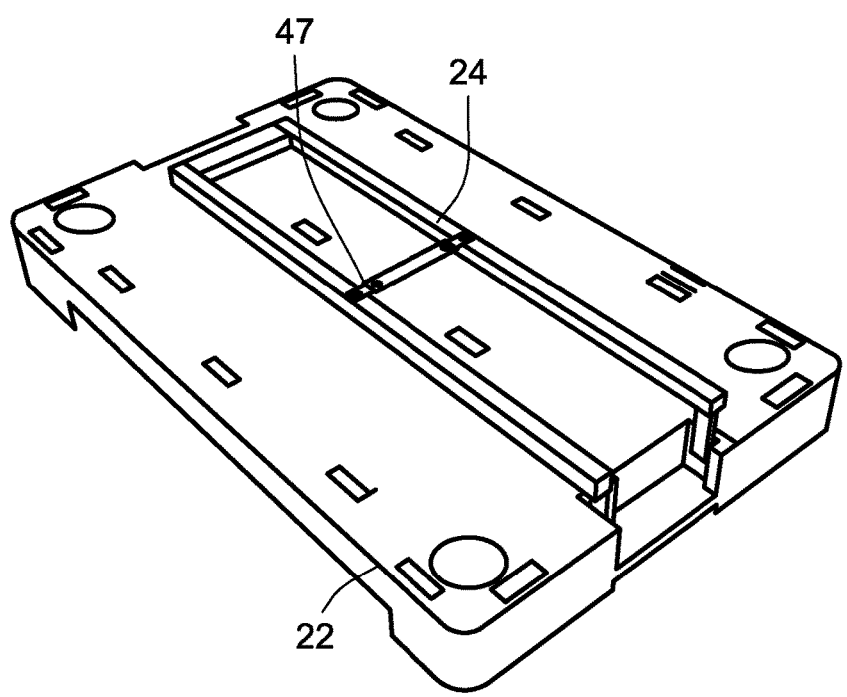
FIG. 6 is a perspective view of the dolly and handle of FIG. 5 with the handle in a collapsed position; and, FIG. 7 is a perspective view of two stacked dollies having handles in the collapsed position in accordance with the present invention.

FIG. 6 shows the handle 24 in a second position against the upper surface 26 of the platform 23. In this configuration, the dolly 22 and handle 24 can be stored or transported together. That is, the handle 24 does not have to be separately stored or transported as in the past. Moreover, the dollies 22 can be stacked, as shown in FIG. 7, without the handle 24 getting in the way.

To accommodate movement of the handle 24 from the first position to the second position (and back to the first position), the handle 24 can be rotatably connected to the platform 23. The rotatable connection may also accommodate positioning the handle 24 in other positions between the first and second positions. The connection may also be provided with a locking mechanism to keep the handle 24 in the desired position.

The platform 23 of the dolly is preferably a molded plastic. Moreover, the platform 23 can include projections and other structure for facilitating stacking of various containers or other items. The dolly can also have one or more openings and include ribbing structure.

The handle 24 can be formed from metal or plastic or other suitable materials. Additionally, the handle 24 can be detachably connected.

As shown in FIG. 5, the handle 24 includes a first bar 42 extending lengthwise through the handle structure 24, and a second bar 44 extending through the handle structure 24. The first bar 42 and second bar 44 are generally parallel, and are separated by the hand grasping portion 40 at one end and a middle beam 46 at a mid-portion of each of the first bar 42 and second bar 44. The middle beam 46 can include a hinge 47 to facilitate connection to the platform by enabling the first bar 42 and second bar 44 to move closer to each other.

In accordance with one alternative, the upper surface 26 can include a recess for receiving the handle 24 in the second position. In this manner, the handle could be positioned flush or below (at least in part) the upper surface 26.

In another alternative, the handle 24 can be slid or rotated to the lower portion of the dolly or cart. In this embodiment, the handle can be stored with the dolly when there is a load on the upper surface 26.

In a further embodiment, the handle 24 can be extendable to different lengths. For example, the handle 24 can include a telescoping structure.

Many modifications and variations of the present invention are possible in light of the above teachings. It is, therefore, to be understood within the scope of the appended claims the invention may be protected otherwise than as specifically described.

We claim:

1. A transport structure with a detachable handle moveable from a first position to a second position comprising:
   a platform having a generally planar upper surface for supporting loads and a plurality of wheels connected to a lower surface; and,
   a detachable handle having a first end and a second end, the handle connected to the platform proximate the first end, the handle moveable from a first position extending upwardly and outwardly from the platform, to a second collapsed position extending generally parallel to the upper surface of the platform, wherein the handle includes a first bar extending a length of the handle and a second bar extending a length of the handle that is moveable toward the first bar to facilitate detaching the handle from the platform, and wherein the first bar is separated from the second bar by a hand clasping portion.

2. The transport structure of claim 1 wherein the platform is part of a dolly.

3. The transport structure of claim 1 wherein the platform is part of a cart.

4. The transport structure of claim 1 wherein the handle is rotatably connected to the platform.

5. The transport structure of claim 4 wherein the handle is connected proximate a first edge of the platform.

6. The transport structure of claim 1 further comprising a middle beam connected to a mid-portion of the first bar and a mid-portion of the second bar.

7. The transport structure of claim 6 wherein the the middle beam is hingedly attached to one of the first bar and the second bar to enable movement of the first bar toward the second bar.

8. The transport structure of claim 1 wherein the handle is extendable.

9. The transport structure of claim 1 wherein the platform is a molded plastic.

10. The transport structure of claim 1 wherein the platform includes a recess in the upper surface to accommodate the handle when the handle is in the second position.

11. The transport structure of claim 1 wherein the handle is formed from plastic.

12. The transport structure of claim 1 wherein the handle is formed from metal.

13. A dolly comprising:
a generally rectangular platform having an upper support surface, the platform having a first side, a second side opposing the first side, a first end and a second end opposing the first end, and a plurality of wheels connected to a lower portion of the platform;
a detachable handle structure connected to the platform, the handle structure having a first extended position for enabling one of pushing and pulling the dolly using the handle, and a second collapsed position, wherein the handle includes a first bar extending a length of the handle and a second bar extending a length of the handle that is moveable toward the first bar to facilitate detaching the handle from the platform.

14. The dolly of claim 13 wherein the handle includes a first end connected to the platform and a second end having a hand clasp portion.

15. The dolly of claim 13 wherein the handle is connected proximate the first end of the platform.

16. The dolly of claim 13 wherein the handle is connected proximate the first side of the platform.

17. The dolly of claim 13 wherein the handle is rotatably connected to the platform.

18. The dolly of claim 13 further comprising a recess in the upper surface of the platform for receiving the handle when the handle is in the second position.

19. The dolly of claim 13 wherein the handle is extendable from a first length to a second length greater than the first length.

20. The dolly of claim 13 wherein the platform is a molded plastic.

* * * * *